(12) United States Patent
Zhou et al.

(10) Patent No.: US 10,941,272 B2
(45) Date of Patent: Mar. 9, 2021

(54) LIQUID COATINGS INCLUDING EXPANDABLE GRAPHITE

(71) Applicant: FIRESTONE BUILDING PRODUCTS CO., LLC, Nashville, TN (US)

(72) Inventors: Wensheng Zhou, Carmel, IN (US); Michael J. Hubbard, Murfreesboro, TN (US)

(73) Assignee: Firestone Building Products Co., LLC, Nashville, TN (US)

(*) Notice: Subject to any disclaimer, the term of this patent is extended or adjusted under 35 U.S.C. 154(b) by 105 days.

(21) Appl. No.: 16/025,264

(22) Filed: Jul. 2, 2018

(65) Prior Publication Data

US 2018/0305931 A1    Oct. 25, 2018

Related U.S. Application Data

(63) Continuation of application No. 14/516,932, filed on Oct. 17, 2014, now Pat. No. 10,017,943, which is a
(Continued)

(51) Int. Cl.
| | | |
|---|---|---|
| *C08K 3/04* | (2006.01) | |
| *C09D 175/04* | (2006.01) | |
| *C09D 183/04* | (2006.01) | |
| *C09D 201/00* | (2006.01) | |
| *C09D 195/00* | (2006.01) |

(Continued)

(52) U.S. Cl.
CPC ............... *C08K 3/04* (2013.01); *C08G 18/42* (2013.01); *C08G 18/4277* (2013.01); *C08G 18/48* (2013.01); *C08G 18/6216* (2013.01); *C08G 18/6283* (2013.01); *C08G 18/6476* (2013.01); *C08G 18/69* (2013.01); *C08G* *18/73* (2013.01); *C08G 18/755* (2013.01); *C08G 18/758* (2013.01); *C08G 18/765* (2013.01); *C08G 18/7621* (2013.01); *C08G 18/7671* (2013.01); *C08L 101/00* (2013.01); *C09D 175/04* (2013.01); *C09D 183/04* (2013.01);
(Continued)

(58) Field of Classification Search
CPC .. C08G 18/10; C08G 18/307; C08G 18/3225; C08G 18/42; C08G 18/4277; C08G 18/48; C08G 18/6216; C08G 18/6283; C08G 18/6476; C08G 18/69; C08G 18/73; C08G 18/755; C08G 18/758; C08G 18/7621; C08G 18/765; C08G 18/7671; C09D 175/04; C09D 183/04; C09D 195/00; C09D 201/00; C08L 101/00; E04D 7/00
See application file for complete search history.

(56) References Cited

U.S. PATENT DOCUMENTS 4,038,239 A    7/1977 Coyner
4,229,329 A    10/1980 Bennett
(Continued)

FOREIGN PATENT DOCUMENTS

WO    2013/102208 A1    7/2013
WO    2015/013176 A1    1/2015

*Primary Examiner* — Arti Singh-Pandey
(74) *Attorney, Agent, or Firm* — Thomas R. Kingsbury; Arthur M. Reginelli

(57) ABSTRACT

A method of preparing a seamless membrane over a flat or low-sloped roof, the method comprising applying multiple layers of a liquid coating composition over a roof surface, where said step of applying includes applying at least one layer of a liquid coating composition that includes expandable graphite.

8 Claims, 3 Drawing Sheets

Related U.S. Application Data continuation of application No. 13/799,668, filed on Mar. 13, 2013, now abandoned.

(60) Provisional application No. 61/764,725, filed on Feb. 14, 2013.

(51) Int. Cl.

| | | |
|---|---|---|
| *C08G 18/42* | (2006.01) | |
| *C08G 18/62* | (2006.01) | |
| *C08G 18/75* | (2006.01) | |
| *C08G 18/76* | (2006.01) | |
| *E04D 7/00* | (2006.01) | |
| *C08G 18/73* | (2006.01) | |
| *C08G 18/64* | (2006.01) | |
| *C08G 18/69* | (2006.01) | |
| *C08G 18/48* | (2006.01) | |
| *C08L 101/00* | (2006.01) | |

(52) U.S. Cl.
CPC ......... *C09D 195/00* (2013.01); *C09D 201/00* (2013.01); *E04D 7/00* (2013.01)

(56) References Cited

U.S. PATENT DOCUMENTS

| | | |
|---|---|---|
| 4,640,864 A | 2/1987 | Porter |
| 4,668,315 A | 5/1987 | Brady |
| 4,745,032 A | 5/1988 | Morrison |
| 4,859,723 A | 8/1989 | Kyminas et al. |
| 5,516,817 A | 5/1996 | Slusher et al. |
| 5,573,092 A | 11/1996 | Gabilondo |
| 5,891,563 A | 4/1999 | Letts |
| 5,968,669 A | 10/1999 | Liu et al. |
| 6,044,604 A | 4/2000 | Clayton |
| 6,084,008 A | 7/2000 | Liu |
| 6,117,375 A | 9/2000 | Garrett |
| 6,174,960 B1 | 1/2001 | Phan et al. |
| 6,207,085 B1 | 3/2001 | Ackerman |
| 6,214,450 B1 | 4/2001 | Wickert |
| 6,538,060 B2 | 3/2003 | Rajalingam |
| 6,544,596 B2 | 4/2003 | Clemens et al. |
| 6,706,793 B2 | 3/2004 | Abu-Isa et al. |
| 6,849,338 B2 | 2/2005 | Clemens et al. |
| 7,387,753 B2 | 6/2008 | Tackett |
| 7,401,843 B2 | 7/2008 | Dunaway |
| 7,605,188 B2 | 10/2009 | Loh et al. |
| 7,612,120 B2 | 11/2009 | Letts |
| 7,677,009 B2 | 3/2010 | Bowman |
| 7,803,867 B2 | 9/2010 | Hanrahan |
| 7,833,575 B2 | 11/2010 | Gupta |
| 7,838,568 B2 | 11/2010 | Letts |
| 7,878,301 B2 | 2/2011 | Gross et al. |
| 8,178,449 B2 | 5/2012 | La Vietes et al. |
| 8,277,949 B2 | 10/2012 | Smith |
| 8,530,034 B2 | 9/2013 | Khan et al. |
| 2002/0013379 A1 | 1/2002 | Singh |
| 2003/0032351 A1 | 2/2003 | Horner |
| 2003/0082365 A1 | 5/2003 | Geary |
| 2003/0139492 A1 | 7/2003 | Abu-Isa |
| 2003/0153656 A1 | 8/2003 | Sjerps |
| 2004/0109983 A1 | 6/2004 | Rotter |
| 2004/0121152 A1 | 6/2004 | Toas |
| 2005/0139126 A1 | 6/2005 | Khan et al. |
| 2005/0145139 A1 | 7/2005 | Khan et al. |
| 2005/0257875 A1 | 11/2005 | Khan et al. |
| 2005/0288394 A1 | 12/2005 | Rothman et al. |
| 2006/0144012 A1 | 7/2006 | Manning et al. |
| 2006/0160978 A1 | 7/2006 | Gupta et al. |
| 2006/0191232 A1 | 8/2006 | Salazar et al. |
| 2006/0217451 A1 | 9/2006 | Bonapersona |
| 2006/0225618 A1 | 10/2006 | Guevara et al. |
| 2006/0240224 A1 | 10/2006 | Khan et al. |
| 2006/0273290 A1 | 12/2006 | Khan et al. |
| 2007/0166454 A1 | 7/2007 | Gupta |
| 2008/0097043 A1 | 4/2008 | Tong |
| 2008/0102243 A1 | 5/2008 | Gupta |
| 2008/0184642 A1 | 8/2008 | Sebastian et al. |
| 2008/0188590 A1 | 8/2008 | Gupta |
| 2009/0090074 A1 | 4/2009 | Klein |
| 2009/0309077 A1 | 12/2009 | Gupta et al. |
| 2009/0326117 A1 | 12/2009 | Benussi et al. |
| 2010/0080920 A1 | 4/2010 | Lagrange et al. |
| 2010/0167013 A1 | 7/2010 | Cruz et al. |
| 2010/0273902 A1 | 10/2010 | Ladely et al. |
| 2010/0320030 A1 | 12/2010 | Ogawa et al. |
| 2011/0002998 A1 | 1/2011 | Ishaque et al. |
| 2011/0015290 A1 | 1/2011 | Schmitz et al. |
| 2011/0065840 A1 | 3/2011 | Freidank et al. |
| 2011/0185656 A1 | 8/2011 | Klein |
| 2011/0247215 A1 | 10/2011 | Schmidt et al. |
| 2011/0311793 A1 | 12/2011 | Burgess et al. |
| 2011/0313084 A1 | 12/2011 | Furar et al. |
| 2012/0009407 A1 | 1/2012 | Peeler et al. |
| 2012/0022176 A1 | 1/2012 | Stahl et al. |
| 2012/0100289 A1 | 4/2012 | Egan et al. |
| 2012/0142240 A1 | 6/2012 | Eling et al. |
| 2012/0160414 A1 | 6/2012 | Pampanas |
| 2012/0174508 A1 | 7/2012 | Brooks et al. |
| 2012/0189838 A1 | 7/2012 | Pellacani et al. |
| 2012/0264843 A1 | 10/2012 | Glos |
| 2012/0266553 A1 | 10/2012 | Shiao et al. |
| 2013/0036714 A1 | 2/2013 | Bolton et al. |
| 2014/0013693 A1 | 1/2014 | Zhou et al. |
| 2014/0127443 A1 | 5/2014 | Zhou et al. |
| 2014/0141672 A1 | 5/2014 | Hubbard et al. |
| 2014/0205789 A1 | 7/2014 | Zhou et al. |
| 2014/0215937 A1 | 8/2014 | Zhou et al. |

LIQUID COATINGS INCLUDING EXPANDABLE GRAPHITE

This application is a divisional application of U.S. Non-Provisional application Ser. No. 14/516,932 filed on Oct. 17, 2014 and issued as U.S. Pat. No. 10,017,943, which is a continuation application of U.S. Non-Provisional application Ser. No. 13/799,668 filed on Mar. 13, 2013, and claims the benefit of U.S. Provisional Application Ser. No. 61/764,725 filed Feb. 14, 2013, which are incorporated herein by reference.

FIELD OF THE INVENTION

Embodiments of the present invention are directed toward liquid coatings that include expandable graphite.

BACKGROUND OF THE INVENTION

Liquid coatings are employed in building materials. Many roofs are covered with liquid coatings to form polymeric membranes. Liquid coatings are especially useful for use over flat or low-slope surfaces, such as flat or low-slope roofing, and they can be field applied. Traditional field-applied coatings for roofs are based upon acrylic, urethane or silicone resins. Polymer modified asphalt or bitumen liquid coatings may also be used. These coatings are often spray applied over existing or new roofs where the substrate may include a variety of materials such as wood, concrete, insulation foam, or EPDM, asphalt, polyolefin membrane.

For example, as disclosed in U.S. Pat. No. 7,401,843, roofing coatings, such as polyurethane coatings, can be applied to a roof to form a single layer coating forming a waterproofing membrane with a thickness of at least 10 mils. Similarly, U.S. Pat. No. 7,803,867 discloses an acrylic-modified fluoropolymer for use over flat or low-slope roofing to provide a coating having very low volatile organic compound (VOC) levels with improved weatherability, dirt pickup resistance, and stain blocking properties as compared to conventional acrylic, urethane and silicone coatings. Additionally, in U.S. Pat. No. 6,538,060, discloses elastomeric polyurethane interpenetrating network compositions that are developed by in situ reaction of polyols with different isocyanates and polyisocyanates in a bituminous material, such as asphalt, coal tar, polymer modified asphalt, oxidized, and unoxidized asphalt. The bituminous polyurethane interpenetrating network elastomers are suitable for a wide variety of applications including but not limited to roofing, new construction, and wall and foundation water-proofing applications.

There is a desire to improve the flame and fire resistance of building materials such as liquid coatings.

SUMMARY OF THE INVENTION

One or more embodiments of the invention provide a method of preparing a seamless membrane over a flat or low-sloped roof, the method comprising applying multiple layers of a liquid coating composition over a roof surface, where said step of applying includes applying at least one layer of a liquid coating composition that includes expandable graphite.

Still other embodiments of the invention provide a multi-layered seamless roof comprising a roof deck optionally one or more of an insulation board, a cover board, and a membrane forming an optional first surface over the roof deck, where a seamless polymeric layer disposed on said roof deck or said optional first surface, and a second seamless polymeric layer disposed on said first seamless polymeric layer, where at least one seamless polymeric layer of the multi-layered seamless roof includes expandable graphite.

Still other embodiments of the invention provide a coating composition for forming a seamless polymeric roof of the type that is used to form a seamless polyurethane membrane, a seamless polysiloxane membrane, a seamless polymeric resin membrane, or a seamless polymeric-modified asphalt membrane, the improvement comprising expandable graphite dispersed within said coating composition.

DETAILED DESCRIPTION OF ILLUSTRATIVE EMBODIMENTS

Figure 1:
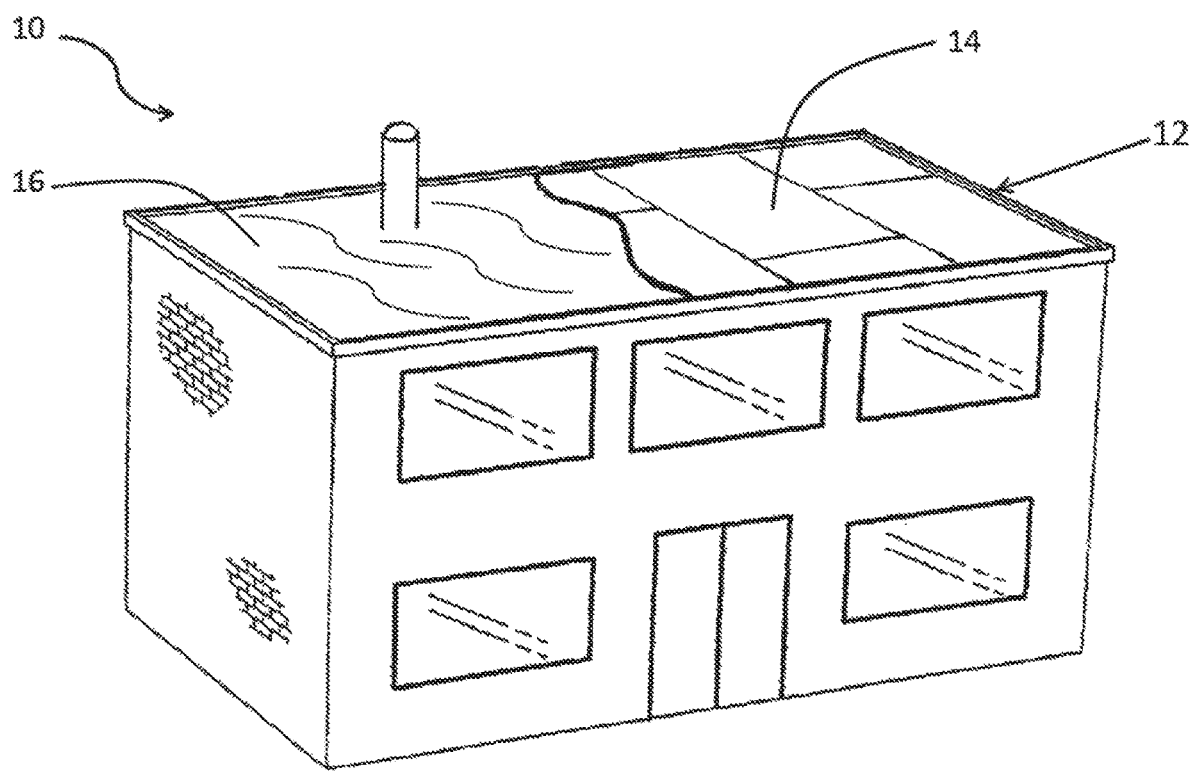
FIG. 1 is a perspective view of a building having a seamless roof according to one or more embodiments of the invention.

Embodiments of the present invention are based, at least in part, on the discovery of a liquid coating composition containing expandable graphite. In one or more embodiments, the expandable graphite is dispersed within the constituents of the liquid coating; in other words, the liquid coating forms a matrix in which the expandable graphite is dispersed. In particular embodiments, the liquid coating composition is applied to a building material to form a wet coating, and upon drying and/or curing, the cured coating provides the building material with increased flame and/or fire resistance while providing the building material with a barrier. In one or more embodiments, the building material is advantageously a roofing substrate, and the composition of the present invention can be used to form a roofing membrane having improved flame-spread and/or fire resistance.

Liquid Coating Composition

Practice of one or more embodiments of the present invention are not limited by the liquid coating composition employed. In one or more embodiments, the constituents that form the liquid coating composition in which the expandable graphite is dispersed may include conventional constituents used to form liquid coating compositions. Included among useful liquid coating compositions are polymeric compositions including, but not limited to, polyurethane coating compositions, polymeric resin coating compositions, and siloxane coating compositions, as well as polymer-modified asphalt or bitumen coating compositions. In one or more embodiments, the coating compositions of the present invention may be employed to prepare at least one layer of a monolithic (i.e. seamless), fully-adhered polymeric (e.g. elastomeric) membrane that may be formed in situ on a roof surface. As will be described in greater detail herein, the polymeric membranes may be multi-layered as a result of multiple applications of a coating composition, wherein at least one layer includes the compositions of the present invention. These multiple layers may be interlaid with one or more fabric or reinforcing layers.

In one or more embodiments, these liquid coating compositions include at least 0.5 wt. %, in other embodiments at least 1.0 wt. %, in other embodiments at least 3 wt. %, in other embodiments at least 5 wt. %, and in other embodiments at least 7 wt. % expandable graphite, based on the entire weight of the liquid composition. In these or other embodiments, these coating compositions include at most 40 wt. %, in other embodiments at most 30 wt. %, in other embodiments at most 25 wt. %, in other embodiments at most 20 wt. %, and in other embodiments at most 15 wt. % expandable graphite, based on the entire weight of the liquid composition. In one or more embodiments, these compositions include from about 0.5 to about 40, in other embodiments from about 1 to about 25, and in other embodiments from about 2 to about 20 wt. % expandable graphite, based upon the entire weight of the liquid composition.

Upon curing and/or drying, which may include evaporation of a solvent, the remaining coating may be characterized by including at least 1 wt. %, in other embodiments at least 3 wt. %, in other embodiments at least 5 wt. %, in other embodiments at least 7 wt. %, and in other embodiments at least 10 wt. % expandable graphite, based on the entire weight of the dried or cured coating. In these or other embodiments, the dried coating compositions include at most 40 wt. %, in other embodiments at most 35 wt. %, in other embodiments at most 30 wt. %, in other embodiments at most 25 wt. %, and in other embodiments at most 20 wt. % expandable graphite, based on the entire weight of the dried or cured composition. In one or more embodiments, the dried coating compositions include from about 1 to about 40, in other embodiments from about 2 to about 25, and in other embodiments from about 3 to about 20 wt. % expandable graphite, based upon the entire weight of the dried or cured coating composition.

As suggested above, the coating compositions of the present invention are liquid compositions, which refers to the compositions being in the liquid state at conditions of temperature and pressure that would be experienced during practical application of the compositions to a roofing surface. In one or more embodiments, the compositions are liquids at temperatures from about −5° C. to about 110° C., in other embodiments from about 0° C. to about 100° C., and in other embodiments from about 10° C. to about 90° C.

Polyurethane Coating

In one or more embodiments, the liquid coating composition is a polyurethane coating composition. These coating compositions may be referred to as liquid polyurethane coating compositions or simply as polyurethane coating compositions. These coatings are generally known as disclosed in U.S. Pat. Nos. 4,038,239 and 7,401,843, and U.S. Publ. No. 2012/0160414, all of which are incorporated herein by reference.

In one or more embodiments, the coating composition is a non-reactive polyurethane coating composition, which refers to the fact that the solids polymer portion of the coating composition does not include free or reactive isocyanate functionality. In other embodiments, the coating composition is a reactive polyurethane coating composition, which refers to the fact that the solids polymer portion of the coating composition includes free or reactive isocyanate functionality.

In one or more embodiments, the polyurethane coating composition is includes a polyurethane latex or dispersion. As the skilled person understands, these compositions include polyurethane polymer dispersed within an aqueous medium. Upon application of the coating and subsequent evaporation of the water, the polyurethane polymer forms a coating composition. These compositions, which may also be referred to as water-based polyurethane coating compositions, are described, for example, in U.S. Pat. No. 6,214,450, which is incorporated by herein by reference. In one or more embodiments, these water-based polyurethane coating compositions include non-reactive polyurethane polymers. In accordance with practice of the present invention, the latex or dispersion includes the expandable graphite.

In other embodiments, the polyurethane coating composition is a solvent-borne composition. As the skilled person understands, these compositions include polyurethane polymer dispersed or dissolved within a solvent. Upon application of the coating and subsequent evaporation of the solvent, the polyurethane polymer forms a coating composition. In one or more embodiments, these solvent-borne polyurethane coating compositions include non-reactive polyurethane polymers. In accordance with practice of the present invention, the solvent-borne composition includes the expandable graphite.

In yet other embodiments, reactive coating compositions are employed. As the skilled person understands, these compositions may include one-part or two-part polyurethane compositions. In one or more embodiments, the composition is a one-part composition that may, for example, include one or more isocyanates or polyisocyanates (e.g. polyisocyanate prepolymers); these systems may be moisture curable. In other embodiments, the composition is a two-part composition wherein a first part supplies the isocyanates or polyisocyanates, and the second part supplies the hydroxyl-bearing compound such as a polyol. As is known in the art, these systems may include one or more catalyst compounds, fillers, plasticizers, and/or other ingredients that are generally known in the art.

In particular embodiments, the first part includes a urethane prepolymer that is formed from a polyol and an aliphatic isocyanate, optionally in the presence of a diluent. Any suitable polyol and aliphatic isocyanate may be used. For example, the polyol can be a caprolactonepolyol, a polyester polyol, a polyether polyol, or an acrylic polyol. The aliphatic isocyanate may be, but is not limited to, dicyclohexylmethanediisocyanate, trimethylhexamethylenediisocyanate, hexane diisocyanate, m-tetramethylxylenediisocyanate, 1,4-tetramethylene diisocyanate, and isophoronediisocyanate. Useful diluents that may be used include those compounds that can reduce the viscosity of the composition. Examples of suitable diluents include, but are not limited to, propylene carbonate, ethylene carbonate, butylene carbonate, odorless mineral spirits, plasticizers, and combinations thereof.

In one or more embodiments, the second part of the composition may include one or more aromatic or aliphatic amine crosslinkers. Examples of suitable amines include, but are not limited to, isophoronediamine, hindered aliphatic diamines, hexamethylenediamine, a polyoxypropylenediamine, 2-methylpentane diamine, 3-propane diamine, 2-methyl-1,5-pentane diamine, p-amino cyclohexyl methane, diethyl toluene diamine, di-(methylthio)toluene diamine, N,N'-dimethylaminodiphenylmethane, N,N'-diethylaminodiphenylmethane, and toluene diamine.

In one or more embodiments, the second part of the composition includes expandable graphite. In other embodiments, the first part of the composition includes expandable graphite. In yet other embodiments, both the first and the second parts of the composition include expandable graphite. The type and amount of expandable graphite are described herein.

Additionally, the first or second part of the composition can include a plasticizer, pigment dispersions, dispersing aids, freeze/thaw stabilizers, etc. Examples of suitable plasticizers include, but are not limited to, butyl benzyl phthalate, tricresylphosphate, triphenyl phosphate, butyl decyl phthalate, 1-Isopropyl-2,2dimethyltrimethylenediisobutyrate, dioctyl phthalate, triisooctyltrimellitate, diooctyladipate, and any other suitable phthalate and non-phthalate plasticizers. Examples of suitable dispersing aids include, but are not limited to Nuosperse 657 (Condea Servo LLC Piscataway, N.J.), BYK-104S (BYK-Chemie USA Wallingford, Conn.), and Disperbyk 190 (BYK-Chemie USA Wallingford, Conn.). Examples of suitable freeze/thaw additives include, but are not limited to, ethylene glycol, propylene glycol, glycerin, dipropylene glycol, and ethoxylatednonyl phenol. Examples of suitable pigment dispersion include, but are not limited to, titanium oxide and iron oxide pigments dispersed in plasticizer.

The first and second parts of the composition may be mixed to form the liquid coating. The liquid coating can be fast curing under normal temperature and humidity conditions. The first and second parts of the composition may be mixed in any suitable ratio. For example, the first and second parts of the composition may be mixed in a ratio between about 1:1 to a ratio of about 20:1 or a ratio of 2:1 or 5:1. The composition may be formulated so that the coating has a light color, such as white or off-white. The composition may have any suitable viscosity. For example, the first part may have a viscosity of between about 500 to about 1000 cps, and the second part may have a viscosity of between about 100 to about 300 cps. The composition may have an initial mixed viscosity of between about 2,000 to about 4,000 cps.

Resin Coatings

In one or more embodiments, the liquid coating composition is a polymeric resin coating composition. These coating compositions may also be referred to binder compositions or film-forming compositions. In one or more embodiments, these coating compositions include acrylic resins, vinyl acetate resins, halogen addition resins, and/or vinyl acrylic resins. The term acrylic resin is used in its broadest sense and includes polymers and copolymers prepared from polymerizing monomer including acrylic acid, methacrylic acid, acrylates, methacrylates, acrylamides, methacrylimdes, and/or acrylonitrile. In one or more embodiments, the resin coating compositions are non-reactive compositions. In other embodiments, the resin coating compositions are reactive compositions. In one or more embodiments, the reactive resin compositions may include one-part or two-part reactive resin compositions. In one or more embodiments, these coating compositions are in the form of a latex. Exemplary resin coatings are generally known as disclosed in U.S. Pat. Nos. 4,229,329, 4,859,723, 4,745,032, and 6,174,960, all of which are incorporated herein by reference.

In one or more embodiments, the polymeric resin composition includes polymer characterized by a number average molecular weight that is greater than 10 kg/mol, in other embodiments greater than 25 kg/mol, and in other embodiments greater than 50 kg/mol. In these or other embodiments, the polymer may be characterized by a number average molecular weight of from about 10 to about 500 kg/mol, in other embodiments from about 25 to about 300 kg/mol, and in other embodiments from about 50 about 200 kg/mol.

In one or more embodiments, the polymeric resin composition is a latex that may be characterized by a solids content of at least 40 wt %, in other embodiments at least 50 wt %, and in other embodiments at least 60 wt %. In these or other embodiments, the composition is a latex that may be characterized by a solids content of at most 90 wt %, in other embodiments at most 80% wt %, and in other embodiments at most 70 wt %. In these or other embodiments, the latex may be characterized by a solids content of from about 40 to about 90 wt %, in other embodiments from about 50 to about 80 wt %, and in other embodiments from about 60 about 70 wt %.

In one or more embodiments, the polymeric resin composition includes polymer that, upon film formation, may be characterized by a Tg of less than 40° C., in other embodiments less than 20° C., in other embodiments less than 0° C., in other embodiments less than −20° C., and in other embodiments less than −40° C. In these or other embodiments, the polymer may be characterized by a Tg of from about −60 to about 40° C., in other embodiments from about −40 to about 20° C., and in other embodiments from about −20 about 0° C.

In one or more embodiments, the polymeric resin composition is a latex that may be characterized by a pH of at least 4, in other embodiments at least 5, and in other embodiments at least 7. In these or other embodiments, the composition is a latex that may be characterized by a pH of at most 9, in other embodiments at most 8, and in other embodiments at most 7. In these or other embodiments, the latex may be characterized by a pH of from about 4 to about 9, in other embodiments from about 5 to about 8, and in other embodiments from about 7 about 8.

In one or more embodiments, the resin polymer includes one or more units deriving from a monomer selected from vinylidene fluoride, vinyl fluoride, trifluoroethylene, chlorotrifluoroethylene (CTFE), tetrafluoroethylene (TFE), and hexafluoropropylene (HFP) and their respected copolymers. Examples of these coating compositions are disclosed in U.S. Pat. No. 7,803,867, which is incorporated by reference.

In one or more embodiments, the resin polymer includes one or more units deriving from a monomer selected from alyloxy propane diol (AOPD), isobutylmethacrylate, acetoacetoxyethylmethacrylate (AEA or AAEM), N-alkyl methacrylamide, N-methylolmethacrylamide or NMA, N-alkyl acrylamide, N-dialkyl methacrylamide, N-dialkyl acrylamide, isobutoxymethacrylamide (IBMA or iBMA)), ethylenically unsaturated monomers containing hydroxyl groups (hydroxylethyl methacrylate or HEMA, hydroxyethyl acrylate, hydroxypropyl acrylate, hydroxypropyl methacrylate, diethylene glycol ethyl acrylate or DGEA for example), monomers containing epoxy groups (glycidyl acrylate, glycidyl methacrylate or GMA, for example), monomers containing silanols (trimethoxysilane methacrylate, triethoxysilane methacrylate, trimethyl silyl propyl acrylate (TMPA or TMSPA), for example), and monomers containing aldehyde functions, such as acrolein, alkenyl cyanides, such as acrylonitrile methacrylonitrile.

In one or more embodiments, the resin polymer includes one or more units deriving from a monomer selected from conjugated dienes, for example, 1,3-butadiene, isoprene, fluoro alkyl acrylates, fluoro alkyl methacrylates, aromatic alkenyl compounds, for example, styrene, alpha-methylstyrene, styrene halides and divinyl hydrocarbon compounds, for example, divinyl benzene.

Siloxane Coating Compositions

In one or more embodiments, the liquid coating composition is a siloxane coating composition. These coating compositions include one or more polysiloxane polymers. These compositions may be referred to as liquid silicone coating compositions. In one or more embodiments, these compositions include one or more polysiloxane polymers. In particular embodiments, these polymers include one or more functional groups that facilitate or activate crosslinking of the polymers. Examples of these coating compositions are disclosed in U.S. Pat. No. 4,668,315, which is incorporated herein by reference.

In one or more embodiments, the siloxane coating compositions of this embodiment include a solvent in which the polysiloxane polymers are dispersed or dissolved. In one or more embodiments, these compositions may be characterized by a solids content of at least 40 wt %, in other embodiments at least 50 wt %, and in other embodiments at least 60 wt %. In these or other embodiments, these compositions may be characterized by a solids content of at most 95 wt %, in other embodiments at most 85% wt %, and in other embodiments at most 75 wt %. In these or other embodiments, these compositions may be characterized by a solids content of from about 50 to about 95 wt %, in other embodiments from about 65 to about 90 wt %, and in other embodiments from about 80 about 85 wt %.

In one or more embodiments, the siloxane coating composition includes a polysiloxane polymer characterized by a number average molecular weight that is greater than 10 kg/mol, in other embodiments greater than 25 kg/mol, and in other embodiments greater than 50 kg/mol. In these or other embodiments, the polysiloxane polymer may be characterized by a number average molecular weight of from about 10 to about 500 kg/mol, in other embodiments from about 25 to about 300 kg/mol, and in other embodiments from about 50 about 200 kg/mol.

Polymer Modified Asphalt Liquid Coating

In one or more embodiments, the liquid coating composition is a polymer-modified asphalt or bitumen coating composition. In one or more embodiments, polymers or prepolymers are generated or formed within a matrix of bituminous material such as asphalt. The resulting modified-bituminous compositions can be applied as coatings and sealants to roofing surfaces.

As is known in the art, bituminous material includes bitumen, asphalt, coal tar, and performance-rated asphalt. In one or more embodiments, the use of bituminous materials are useful due to their relatively high penetration value when applied to most porous surfaces, weather-resistant nature, and impermeability to water. Bituminous materials fall into a broad class of carbon-rich materials.

Practice of these embodiments of the invention are not limited by the type of polymer employed to modify the asphalt. For example, the asphalt may be modified with one or more thermoplastic and/or thermoset or thermosetting polymers. Exemplary polymeric materials include, but are not limited to, polyolenfins such as polyethylene, polypropylene, and polystyrene, polydienes such as polybutadiene and polyisoprene, and block and random copolymers such as block poly(styrene-b-diene) copolymers.

In one or more embodiments, the liquid coating composition includes polyurethane-modified bitumen coating, which may be prepared by a melt-blending process. Relevant compositions and techniques are disclosed in U.S. Pat. Nos. 6,538,060 and 8,277,949, which are incorporate herein. According to one or more of these processes, polyol(s) is premixed with the bituminous material at the molten temperature of the bitumen to form a reagent mixture. The reagent mixture may be carried separately from the isocyanate to the mixing head by heated hoses. At the mixing head, the reagent mixture and isocyanate are mixed. The polyurethane prepolymer forms as the reagent material and isocyanate mix. These materials are metered through a narrow metallic tube for sufficient molecular weight buildup and sprayed under pressure through a suitable spray apparatus.

In one or more embodiments, the polyurethane-modified bitumen coatings include those two-part systems that are prepared in the field and applied to a roof surface. For example, a first part may include polyol dissolved in asphalt and optionally solvent. A second part of the system includes the isocyanate, which may be in the form of a polyisocyanate. Upon mixing, the mixture can be applied to the roof surface using known techniques. An example of this type of coating composition is sold under the tradename Ultra-Flash™ (Firestone Building Products Co., LLC).

For example, useful polyols include polyether polyols, polyester polyols, hydroxyl terminated polybutadiene and their copolymer with acrylonitrile, cicinoleic triglyceride (commercially known as "castor oil"), and other vegetable oils of similar nature with different functionality and molecular weight. In at least one embodiment, the polyol is polypropylene glycol. Exemplary isocyanates include diphenylmethanediisocyanates ("MDI"), toluene diisocyanates ("TDI"), hexamethylenediisocyanates (HMDI"), and isophoronediisocyanates ("IPDI").

In one or more embodiments, these polymer-modified asphalt compositions include one or more catalysts such as, but not limited to, dibutyltindilaurate, dioctyltindilaurate, different tertiary amines and organometallic compounds of tin, lead, cobalt, and zinc. Also, these polymer-modified asphalt compositions may include curing agents such as, but not limited to, 3,5-dimethythio-2,6-toluenediamine, 3,5-dimethylthio-2,4-tolunediamine, hexamethylenediamine, and trimethylol propane,polyoxy(methyl-1,2,-ethanediol), alpha-hyrdoxyomega-(2-aminomethylethoxy)-ether with 2-ethyl-2-(hydroxymethyl)-1,3-propanediol(3:1); diethyltoluenediamine; di-(methylthio)toluenediamine; 1,6-hexamethylene diamine; trimethylol propane; 3,5-dimethylthio-2,6-toluenediamine; 3,5-dimethylthio-2,4-toluenediamine, and other di and poly functional amines.

In one or more embodiments, the polymer-modified coating compositions of these embodiments may include at least 20 wt %, in other embodiments at least 30 wt %, and in other embodiments at least 40 wt % polymer based upon the entire weight of the composition. In these or other embodiments, these polymer polymer-modified coating compositions of may include at most 70 wt %, in other embodiments at most 60 wt %, and in other embodiments at most 50 wt % polymer based upon the entire weight of the composition. In one or more embodiments, the polymer-modified coating compositions of these embodiments may include from about 10 to about 80, in other embodiments from about 20 to about 70, and in other embodiments from about 30 to about 60 wt % polymer.

Expandable Graphite

Expandable graphite may also be referred to as expandable flake graphite, intumescent flake graphite, or expandable flake; and, for the purposes herein, these terms may be used interchangeably.

In one or more embodiments, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1. In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1. In certain embodiments, the expandable graphite may be characterized as having an expansion ratio (cc/g) of at most 350:1, and in yet other embodiments at most 300:1.

In one or more embodiments, the expandable graphite, as it exists with the coating composition of the present invention, may be partially expanded. In one or more embodiments, however, the expandable graphite is not expanded to a deleterious degree, which includes that amount or more of expansion that will deleteriously impact the ability to form the coating and/or the ability of the graphite to serve as flame retardant at desirable levels, which include those levels that allow proper formation of the coating. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

In one or more embodiments, the expandable graphite may be characterized by an onset temperature ranging from about 100° C. to about 280° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; it may also be referred to as the temperature at which expansion of the graphite starts.

Complementary Flame Retardants

As mentioned above, the expandable graphite may be used in conjunction with a complementary flame retardant. In other words, the complementary flame retardants are dispersed, along with the expandable graphite, throughout the matrix of the liquid coating composition. These flame retardants may include any compound that increases the burn resistivity, particularly flame spread such as tested by UL 94 and/or UL 790, in the polymeric compositions of the present invention. Generally, useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™.

Examples of other complementary calcium borate, magnesium hydroxide, basic magnesium carbonate, aluminum trihydrate, zinc borate, gypsum, and mixtures thereof. In these or other embodiments, the complementary flame retardant includes colemanite, which is a borate mineral that is believed to include about 50-80% calcium borate.

Preparation of Liquid Coating Composition

In one or more embodiments, the liquid coating composition may generally be prepared by using conventional techniques for forming these compositions. In general, and as those skilled in the art appreciate, the various constituents of the liquid coating compositions, including the expandable graphite, may be introduced and mixed. As is known in the art, these compositions may be prepared under ambient conditions of temperature and pressure, and incorporation of the expandable graphite into these compositions need not alter conventional practices for preparing the compositions. Where applicable, the mixing may take place at elevated temperatures. Where the coating composition is a one-part composition, such as an acrylic coating composition or a moisture-curable coating composition, the expandable graphite may be added to the composition before, after, or during incorporation of the other constituents of the composition. Where the coating composition is a two-part composition, such as a two-part polyurethane composition, the expandable graphite may be added to either the first component (e.g. the A side), the second component (e.g. the B side), or both the first and second components.

In one or more embodiments, the liquid coating compositions of the present invention may be prepared by employing a two-stage mixing process. For example, all of the constituents of the liquid coating composition, except for the expandable graphite, may be first mixed. By mixing the constituents excluding the expandable graphite in a first mixing step, the temperature and/or degree of mixing can be increased as necessary to achieve greater dispersion and/or mixing of the constituents without triggering expansion of or otherwise impact the expandable graphite. Once these constituents are mixed at an appropriate temperature (which will form a premixture), the composition can be cooled, if necessary, and the expandable graphite can then be introduced to the premixture and further mixing may take place to disperse the expandable graphite within the liquid coating composition at an appropriate temperature.

INDUSTRIAL APPLICABILITY

First Embodiment—Fully Adhered Seamless Roofing System

In one or more embodiments, the liquid coating compositions of the present invention, which include expandable graphite, are advantageously employed in combination with construction materials. As a result, the liquid coating compositions not only provide a means by which construction materials can be applied with a seamless membrane or flashing, but they also provide the construction materials with increased flame and/or fire resistance. In one or more embodiments, the construction material is a roofing substrate to which the liquid coating composition is applied to form a seamless membrane or flashing, wherein the membrane or flashing is in the form of a liquid that is permitted to dry and/or cure to thereby leave a solids residue. In one or more embodiments, the coating composition may be used to form membranes over flat or low-slope roofs.

FIG. 1 shows a perspective view of building 10 including flat roof 12, insulation board 14, and seamless membrane 16, where seamless membrane is prepared according to one or more embodiments of the invention.

In particular embodiments, the liquid coating composition of the present invention is applied to a surface of the substrate in a manner that will allow the liquid coating to form a membrane to be installed as part of a fully-adhered roofing system. Those skilled in the art appreciate that fully-adhered roofing systems include those systems wherein the membrane is adhered to the roof substrate substantially across the entire planar surface of the membrane contacting the substrate.

In one or more embodiments, the liquid coating is applied to the substrate to provide a wet thickness of between approximately 5 and 200 mils, in other embodiments between approximately 20 and 100 mils, and in still other embodiments between approximately 25 and 50 mils. Upon drying (e.g. evaporation of solvent), the dried film thickness of the coating may be from about 3 to about 150 mils, in other embodiments from about 4 to about 100 mils, and in other embodiments from about 5 to about 50 mils in thickness.

In one or more embodiments, the liquid coating may be applied as one or more layers. In other words, a single wet film may be applied or multiple wet films may be applied. As is known in the art, a scrim or other fabric may be applied between the various coatings. In accordance with one or more embodiments of the invention, at least one of the layers of the multi-layered system may include expandable graphite in accordance with the present invention. In particular embodiments, the layers including the expandable graphite are proximate to the substrate, and subsequent layers of the coating composition are applied over the layer containing the expandable graphite.

As described above, the liquid coatings of one or more embodiments of the present invention may be employed to form roofing membranes. A flat or low-sloped roof assembly may include a roof deck, and optional insulation layer, and membrane including at least one layer formed by application of the compositions of the present invention.

Practice of this invention is not limited by the selection of any particular roof deck. Accordingly, the roofing systems herein can include a variety of roof decks. Exemplary roof decks include concrete pads, steel decks, wood beams, and foamed concrete decks. Likewise, the skilled person understands that various construction materials, such as insulation boards and/or cover boards may be applied to the roof deck, and then the liquid coating composition can applied to these construction materials. In one or more embodiments, a reinforcement fabric, such as a woven or non-woven scrim, can be applied to the roof deck, and then the liquid compositions of the present invention can be applied to the fabric. In one or more embodiments, the liquid compositions may be applied to existing roofing membranes in a re-roofing situation.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 7,612,120, 7,387,753, 7,838,568, 6,117,375, 6,044,604, 5,891,563, 5,573,092, and U.S. Publication Nos. 2004/0109983, 2003/0082365, 2003/0153656, 2003/0032351, and 2002/0013379, which are incorporated herein by reference. As is known in the art, these insulation or coverboards may include a facer material, where the facer material may include, for example, a polymeric film, a foil, a fabric, or a paper.

Second Embodiment—Moisture Barrier

In yet another embodiment, the liquid coating is applied to a substrate to form a moisture, vapor and/or air barrier having improved flame-resistant and/or fire-resistant properties. As those skilled in the art may appreciate, these moisture barriers may be employed in cavity wall systems to provide both moisture and vapor barrier properties.

Figure 2:
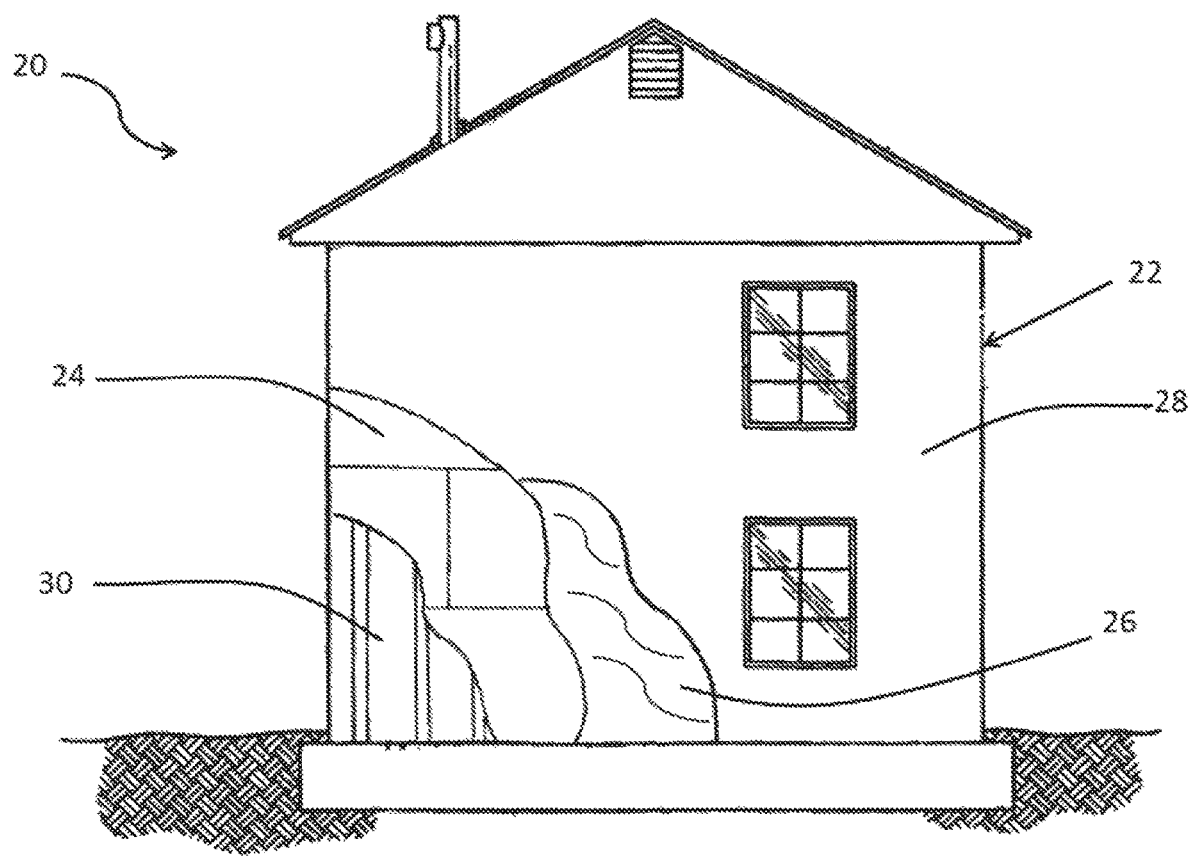
FIG. 2 is a perspective view of a building having a seamless air barrier according to one or more embodiments of the invention.

FIG. 2 shows a perspective view of building 20 including siding system 22, further including stud system 30, insulation board 24, air barrier 26, and siding 28, where air barrier 26 is prepared according to one or more embodiments of the invention.

In one or more embodiments, the liquid coating is applied to the substrate to provide a wet thickness of between approximately 5 and 200 mils, in other embodiments between approximately 20 and 100 mils, and in still other embodiments between approximately 25 and 50 mils. Upon drying (e.g. evaporation of solvent), the dried film thickness of the coating may be from about 3 to about 150 mils, in other embodiments from about 4 to about 100 mils, and in other embodiments from about 5 to about 50 mils in thickness.

In one or more embodiments, the substrate to which the liquid coating can be applied to form a moisture, vapor and/or air barrier includes those construction materials used to form the interior or exterior of walls. For example, the walls may be constructed of wood, masonry block, composite materials, or other synthetic materials.

Third Embodiments—Underlayment

In still other embodiments, the liquid coating is applied to a substrate to form an underlayment having improved flame-resistant and/or fire-resistant properties. As those skilled in the art may appreciate, these underlayments may be employed in a variety of roofing systems, such as metal roof systems, to provide increased flame and/or fire resistance. In one or more embodiments, the underlayment prepared according to one or more embodiments of the present invention meets the standards of ASTM D1970.

Figure 3:
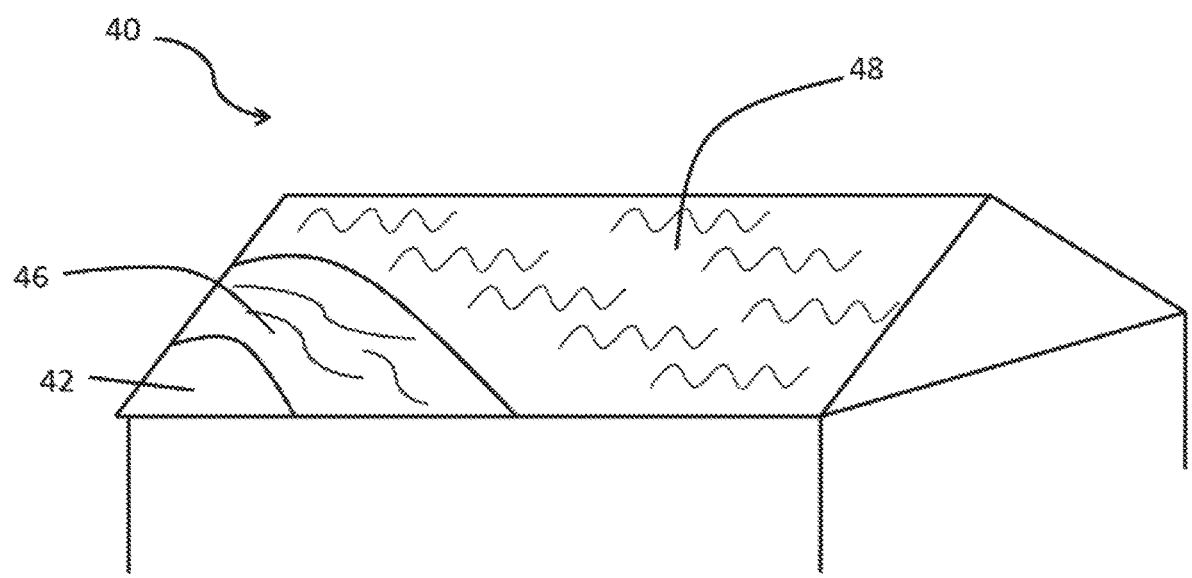
FIG. 3 is a perspective view of a building having a seamless underlayment according to one or more embodiments of the invention.

FIG. 3 shows a perspective view of building roof system 40 including roof deck 42, seamless underlayment 46, and metal roof 48, where the underlayment is prepared according to one or more embodiments of the invention.

In one or more embodiments, the liquid coating is applied to the substrate to provide a wet thickness of between approximately 5 and 200 mils, in other embodiments between approximately 20 and 100 mils, and in still other embodiments between approximately 25 and 50 mils. Upon drying (e.g. evaporation of solvent), the dried film thickness of the coating may be from about 3 to about 150 mils, in other embodiments from about 4 to about 100 mils, and in other embodiments from about 5 to about 50 mils in thickness.

In one or more embodiments, the substrate to which the liquid coating can be applied to form a roofing underlayment includes those construction materials used to form roofs. As the skilled person understands, a roof deck may be fabricated from many materials including, for example, concrete pads, steel decks, wood beams, and foamed concrete decks. Likewise, the skilled person understands that various construction materials, such as insulation boards and/or cover boards may be applied to the roof deck, and then the liquid coating composition can applied to these construction materials. In one or more embodiments, a reinforcement fabric, such as a woven or non-woven scrim, can be applied to the roof deck, and then the liquid compositions of the present invention can be applied to the fabric.

Various modifications and alterations that do not depart from the scope and spirit of this invention will become apparent to those skilled in the art. This invention is not to be duly limited to the illustrative embodiments set forth herein.

What is claimed is:

1. A multi-layered seamless roof comprising:
   (i) a roof deck;
   (ii) optionally one or more of an insulation board, a cover board, and a membrane forming an optional first surface over the roof deck;
   (iii) a seamless polymeric layer covering said roof deck or said optional first surface, and a second seamless polymeric layer disposed on said first seamless polymeric layer, where at least one seamless polymeric layer of the multi-layered seamless roof includes expandable graphite, where said at least one seamless polymeric layer including expandable graphite includes a polymeric monolithic matrix with the expandable graphite in contact with the matrix and dispersed throughout said at least one seamless polymeric layer, and where said seamless polymeric layer disposed on said roof deck or said optional first surface is fully adhered thereto.

2. The multi-layered seamless roof system of claim 1, where said multi-layered seamless roof includes a fabric disposed between said first and said second seamless polymeric layers, and where said fabric is integrally attached to said first and second seamless polymeric layers by virtue of said first and second polymeric layers being applied in the form of a one-part liquid coating.

3. The multi-layered seamless roof system of claim 1, where said first seamless polymeric layer and said second seamless polymeric layer are integrally attached to each other by virtue of the second layer being applied to the first layer in the form of a liquid coating.

4. The multi-layered seamless roof system of claim 1, where said first seamless polymeric layer is integrally attached to said roof deck or said first surface by virtue of the first layer being applied to said roof deck or said first surface in the form of a liquid coating.

5. The multi-layered seamless roof system of claim 1, where said at least one seamless polymeric layer including expandable graphite includes from about 1 to about 30 weight percent expandable graphite.

6. The multi-layered seamless roof system of claim 1, where said at least one seamless polymeric layer includes an acrylic, urethane or siloxane-based polymer.

7. The multi-layered seamless roof system of claim 1, where said at least one seamless polymeric layer is formed by applying a liquid coating composition including said expandable graphite to said roof deck or said optional first surface to thereby form a first layer.

8. The multi-layered roof system of claim 7, where said second seamless polymeric layer is disposed over the first layer and is formed by applying a liquid coating composition to said first layer.

* * * * *